(12) United States Patent
McCulloch et al.

(10) Patent No.: US 7,469,720 B2
(45) Date of Patent: Dec. 30, 2008

(54) HIGH ENERGY DISSIPATIVE AND EROSION RESISTANT FLUID FLOW ENHANCER

(75) Inventors: Stephen McCulloch, Richmond, TX (US); Jimmy Brinkley, Sugar Land, TX (US)

(73) Assignee: Wood Group Pressure Control Limited, Houston, TX (US)

( * ) Notice: Subject to any disclaimer, the term of this patent is extended or adjusted under 35 U.S.C. 154(b) by 602 days.

(21) Appl. No.: 10/833,784

(22) Filed: Apr. 28, 2004

(65) Prior Publication Data

US 2004/0211478 A1    Oct. 28, 2004

Related U.S. Application Data

(60) Provisional application No. 60/466,135, filed on Apr. 28, 2003.

(51) Int. Cl.
*F15D 1/02* (2006.01)

(52) U.S. Cl. .......................... 138/39; 138/42

(58) Field of Classification Search ............ 138/42, 138/39
See application file for complete search history.

(56) References Cited

U.S. PATENT DOCUMENTS

| | | | | |
|---|---|---|---|---|
| 1,942,598 A | * | 1/1934 | Hewgley | 166/91.1 |
| 2,501,593 A | * | 3/1950 | Becker | 138/44 |
| 3,072,261 A | * | 1/1963 | Smith | 210/532.1 |
| 3,157,200 A | * | 11/1964 | Rowan | 137/625.33 |
| 3,470,914 A | * | 10/1969 | Smith | 138/39 |
| 3,693,329 A | | 9/1972 | Willis | |
| 3,921,672 A | * | 11/1975 | Arnold | 138/42 |
| 4,108,210 A | * | 8/1978 | Luthe et al. | 138/42 |
| 4,159,881 A | * | 7/1979 | Gogneau | 48/189.4 |
| 4,244,440 A | | 1/1981 | Matta et al. | |
| 4,384,592 A | * | 5/1983 | Ng | 137/625.37 |
| 4,466,741 A | | 8/1984 | Kojima | |
| 4,679,592 A | * | 7/1987 | Lamb | 137/625.33 |
| 4,701,055 A | * | 10/1987 | Anderson | 366/336 |
| 4,747,697 A | | 5/1988 | Kojima | |
| 4,839,038 A | | 6/1989 | McLain, II | |
| 5,133,383 A | * | 7/1992 | King | 137/625.3 |
| 5,312,083 A | | 5/1994 | Ekman | |
| 5,529,093 A | | 6/1996 | Gallagher et al. | |
| 5,575,561 A | | 11/1996 | Rohwer | |
| 5,664,760 A | | 9/1997 | Army, Jr. et al. | |
| 5,785,089 A | * | 7/1998 | Kuykendal et al. | 138/42 |
| 5,988,586 A | | 11/1999 | Boger | |
| 6,435,216 B2 | | 8/2002 | McCulloch | |
| 6,764,213 B2 | * | 7/2004 | Shechter | 366/167.1 |
| 2004/0007274 A1 | | 1/2004 | McCulloch | |

OTHER PUBLICATIONS

Richter, R: "Hochverschleissfeste Stellventile" VGB Kraftwerkstechnik, VGB Kraftwerkstechnik GMBH, Essen, De, vol. 77, No. 6, Jun. 1, 1997, pp. 476-480, XP000656701.
ISSN: 0372-0575, Figure 2 (Translation of relevant portions of reference included).

\* cited by examiner

*Primary Examiner*—James F Hook
(74) *Attorney, Agent, or Firm*—Bracewell & Giuliani LLP

(57) ABSTRACT

Methods and apparatus for use within a production pipeline or other flowbore to reduce fluid pressure and regulate fluid flow while minimizing erosion effects caused by particulate matter in the fluid, wherein varying geometries with respect to multiple components within a choke valve are utilized to effectuate multiple changes in fluid flow direction, causing a fluid pressure drop at each directional change.

12 Claims, 2 Drawing Sheets

HIGH ENERGY DISSIPATIVE AND EROSION RESISTANT FLUID FLOW ENHANCER

RELATED APPLICATIONS

This application claims the benefit of U.S. Provisional Patent Application Ser. No. 60/466,135, filed Apr. 28, 2003.

BACKGROUND OF THE INVENTION

1. Field of the Invention

The present invention relates to methods and apparatus for reducing fluid pressure and regulating fluid flow within a production pipeline or other flowbore while minimizing erosion effects caused by particulate matter within the fluid.

2. Description of the Related Art

Production pipelines are used to transmit hydrocarbons, in the form of crude oil or natural gas, from a producing well to a storage facility or distribution point. These pipelines typically include one or more flow control devices, commonly referred to as "chokes." The purpose of these devices is to reduce fluid pressure and regulate flow in the hydrocarbon stream. If fluid pressure is not reduced and flow goes unregulated, the high-pressure stream could cause damage to the more vulnerable downstream portions of the pipeline system.

Hydrocarbon streams, particularly natural gas, can often carry solid particulates such as sand. These solid particulates can clog flow in the flow control device and abrade or erode the device's internal components. Accordingly, the flow control device should be resistant to clogging and internal damage caused by such particulate-containing streams.

Various types of flow control devices for pipelines have been proposed to reduce fluid pressure, control fluid flow, and provide resistance to abrasion and/or erosion. These flow control devices primarily utilize some form of stem and seat mechanism, wherein the stem and seat are located within a valve body, and the stem is concentrically located within the seat. During operation, the seat remains static, and the stem moves relative to the seat, exposing a varying area. The exposed area at this single location within these devices controls the amount of pressure drop occurring and the resulting dissipation of energy in the flow stream.

These previously proposed flow control devices suffer from a number of disadvantages. One disadvantage is that the only component within these devices that is utilized to effectuate a significant pressure drop is the geometry of the single varying area. As a result, the pressure drop occurring within the device is primarily limited to that which occurs at this single location within the device. Another disadvantage is that the internal components of the flow control devices are subject to abrasion and erosion as a result of a geometry that brings the components into direct contact with the high pressure, solid particulate-containing hydrocarbon fluid stream.

Prior to the development of the present invention, there has been no choke valve apparatus or fluid flow enhancer apparatus for use as a part of a choke valve which: utilizes controlled geometric principles to effectuate multiple pressure drops at different locations within a flow control device; and encourages erosive solid particulates in a fluid stream to impact surfaces within the flow control device with a degree of angular control that minimizes erosive damage. Additionally, there has been no method of dissipating the energy of, or effectuating multiple pressure drops for, a fluid within a choke valve which: utilizes controlled geometric principles to effectuate such multiple pressure drops at different locations within a flow control device; and encourages erosive solid particulates in a fluid stream to impact surfaces within the flow control device with a degree of angular control that minimizes erosive damage. Therefore, the art has sought methods and apparatus for reducing fluid pressure and regulating fluid flow within a pipeline or other flowbore while minimizing erosion effects caused by particulate matter within the fluid which: utilize controlled geometric principles to effectuate multiple pressure drops at different locations within a flow control device; and encourage erosive solid particulates in a fluid stream to impact surfaces within the flow control device with a degree of angular control that minimizes erosive damage.

SUMMARY OF THE INVENTION

In accordance with the present invention, the foregoing advantages have been achieved through the present fluid flow enhancer for use as a part of a choke valve. The present invention includes: a flow enhancement sleeve having an inner wall surface, an outer wall surface, and first and second ends; a focus rim disposed at the first end of the flow enhancement sleeve; a flow focus element disposed in a spaced relationship from the focus rim, the flow focus element and the focus rim defining a flow passage therebetween; and a flow regulator disposed within a portion of the flow enhancement sleeve for receiving fluid from the flow passage.

Another feature of the present invention is that the fluid flow enhancer may have a helical groove disposed within the outer wall surface of the flow enhancement sleeve. Another feature of the present invention is that the fluid flow enhancer may have a helical groove disposed upon the outer wall surface of the flow enhancement sleeve. Another feature of the present invention is that the fluid flow enhancer may have a flow focus element with a wall surface having an annular shaped recess disposed in the wall surface for deflecting flow across the focus rim. A further feature of the present invention is that the flow enhancer may have a flow focus element with a recess that is inwardly rounded. Another feature of the present invention is that the flow enhancer may have a flow regulator that is a cage-type valve. An additional feature of the present invention is that the flow enhancer may have a flow regulator that is a needle-type valve. Another feature of the present invention is that the fluid flow may be additionally enhanced by varying the shape of the focus rim. A further feature of the present invention is that the fluid flow may be additionally enhanced by varying the distance between the flow focus element and the focus rim.

In accordance with another aspect of the present invention, the foregoing advantages have also been achieved through the present choke valve. The present invention may include: a fluid flow inlet; a fluid flow outlet; and a choke body for facilitating flow between the fluid flow inlet and the fluid flow outlet, the choke body including a housing having an inner wall surface, a flow enhancement sleeve having an inner wall surface, an outer wall surface, and first and second ends, the flow enhancement sleeve disposed within a portion of the housing, a focus rim disposed at the first end of the flow enhancement sleeve, a flow focus element disposed in a spaced relationship from the focus rim, the flow focus element and the focus rim defining a flow passage therebetween, and a flow regulator disposed within a portion of the flow enhancement sleeve for receiving fluid from the flow passage.

Another feature of the present invention is that the choke valve may have a helical groove disposed within the outer wall surface of the flow enhancement sleeve. A further feature of the present invention is that the choke valve may have a helical groove disposed within the inner wall surface of the housing. Another feature of the present invention is that the choke valve may have a helical groove disposed upon the outer wall surface of the flow enhancement sleeve. A further feature of the present invention is that the choke valve may have a helical groove disposed upon the inner wall surface of the housing. Another feature of the present invention is that the choke valve may have a flow focus element with a wall surface having an annular shaped recess disposed in the wall surface for deflecting flow across the focus rim. A further feature of the present invention is that choke valve may have a flow focus element with a recess that is inwardly rounded. Another feature of the present invention is that the choke valve may have a flow regulator that is a cage-type valve. An additional feature of the present invention is that the choke valve may have a flow regulator that is a needle-type valve. An additional feature of the present invention is that the choke valve may have an inner lining disposed adjacent to the inner wall surface of the housing.

In accordance with another aspect of the present invention, the foregoing advantages have also been achieved through the present method of dissipating the energy of a fluid within a choke valve. This aspect of the present invention may include the steps of: utilizing varying geometry with respect to multiple components within the choke valve to effectuate a plurality of changes in the direction of fluid flow; and causing a pressure drop for the fluid at each of the plurality of changes in flow direction.

In accordance with another aspect of the present invention, the foregoing advantages have also been achieved through the present method of dissipating the energy of a fluid within a choke valve. This aspect of the present invention may include the steps of: passing the fluid in a helical direction through a first portion of the choke valve; deflecting the fluid off a second portion of the choke valve; passing the fluid through a flow passage between the first and second portion of the choke valve; and passing the fluid through a flow regulator disposed within the sleeve.

Another feature of the present invention may include the step of: utilizing, as a first portion of the choke valve, a flow enhancement sleeve disposed within the choke valve. A further feature of the present invention may include the step of: utilizing, as a second portion of the choke valve, a flow focus element of the choke valve.

In accordance with another aspect of the present invention, the foregoing advantages have also been achieved through the present method of effectuating multiple pressure drops for a fluid within a choke valve. This aspect of the present invention may include the steps of: causing a first pressure drop by passing the fluid in a helical direction through a first portion of the choke valve; causing a second pressure drop by passing the fluid through a second portion of the choke valve; and causing a third pressure drop by passing the fluid through a third portion of the choke valve.

Another feature of the present invention may include the step of: utilizing, as a first portion of the choke valve, a flow enhancement sleeve disposed within the choke valve. A further feature of the present invention may include the step of: utilizing, as a second portion of the choke valve, the area between a focus rim and a flow focus element of the choke valve. A further feature of the present invention may include the step of: utilizing, as a third portion of the choke valve, a flow regulator disposed within the choke valve.

The methods and apparatus of the present invention for reducing fluid pressure and regulating fluid flow within a pipeline or other flowbore while minimizing erosion effects caused by particulate matter within the fluid, when compared with previously proposed methods and apparatus, have the advantages of: utilizing controlled geometric principles to effectuate multiple pressure drops at different locations within a flow control device; and encouraging erosive solid particulates in a fluid stream to impact surfaces within the flow control device with a degree of angular control that minimizes erosive damage.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
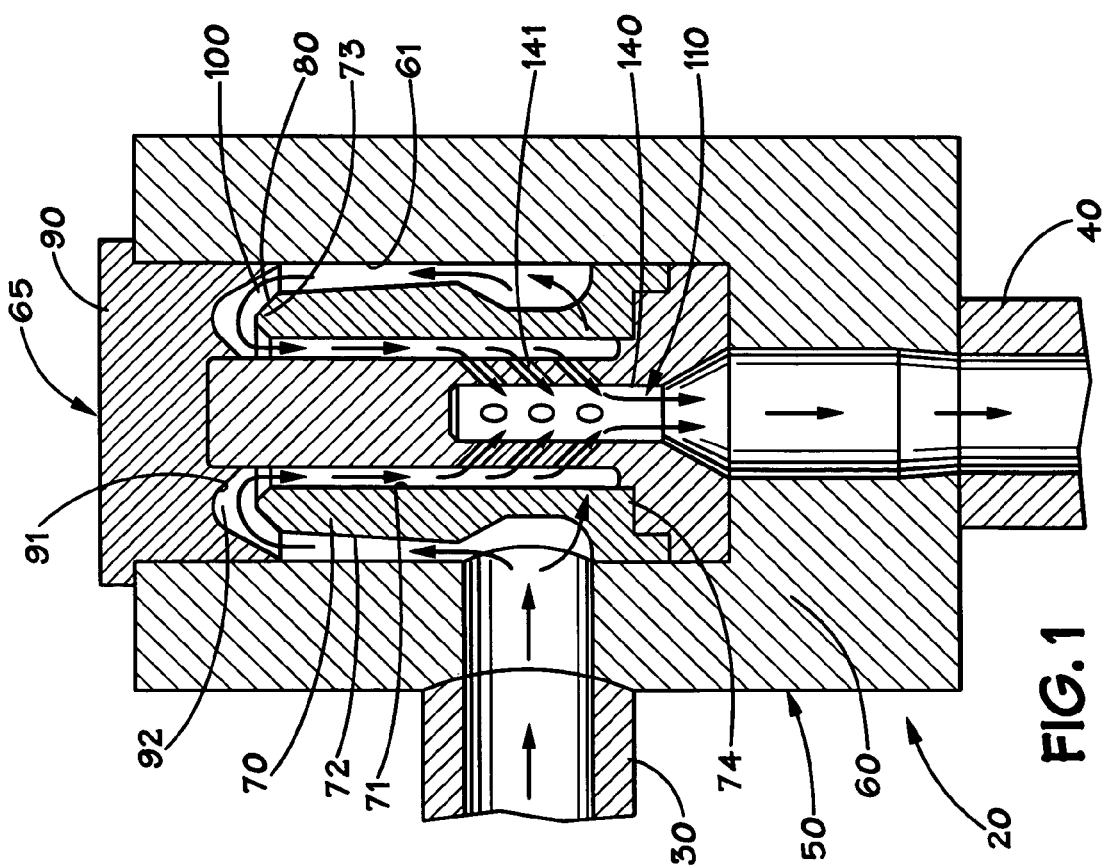
FIG. 1 is a partial cross-sectional side view of the preferred embodiment of the present invention.

With reference to FIG. 1, a choke valve assembly 20 in accordance with the present invention is shown to generally comprise: a flow inlet 30, a flow outlet 40, and a choke body 50. Choke body 50 includes a housing 60 and a fluid flow enhancer 65.

Still with reference to FIG. 1, choke body 50 receives fluid flow from inlet 30 and dispenses fluid flow from outlet 40. Inlet 30 and outlet 40 are preferably set at a right angle to one another, thereby providing an elbow configuration for choke body 50, although other angular dispositions of inlet and outlet 30, 40, could be utilized. Choke body 50 includes a housing 60 having an inner wall surface 61. Housing 60 is typically constructed of a strong and chemically resistant material, such as a steel alloy or any other material having the requisite strength and durability properties to function as housing 60, as known by those skilled in the art. Fluid flow enhancer 65 is disposed within housing 60 and is generally surrounded by inner wall surface 61 of housing 60.

Fluid flow enhancer 65 generally comprises a flow enhancement sleeve 70, a flow focus element 90, and a flow regulator 110. Sleeve 70 is generally tubular shaped, and has an inner wall surface 71, an outer wall surface 72, a first end 73, and a second end 74. A focus rim 80 is disposed at the first end 73 of sleeve 70. Preferably, focus rim 80 is integrally formed with first end 73 of sleeve 70. Focus element 90 is disposed in a spaced relationship from focus rim 80. Preferably, focus element 90 is disposed above, and opposite from, focus rim 80. The area between focus rim 80 and focus element 90 defines a flow passage 100. Flow regulator 110 is disposed within a portion of sleeve 70. Flow regulator 110 may be of a conventional type used to regulate flow in a pipeline or flow control device used therein. A conventional cage-type valve is illustrated in FIG. 1. However, other valves types may be utilized without deviating from the spirit of the present invention.

In operation, as illustrated in FIG. 1, high-pressure fluid enters choke valve assembly 20 through flow inlet 30 and encounters fluid flow enhancer 65. Fluid flow enhancer 65 effectuates a series of pressure drops in the fluid by utilizing varying geometry at different locations of enhancer 65 to cause changes in fluid flow direction, with a resulting pressure drop and corresponding enhanced fluid flow at each change in flow direction.

Figure 2:
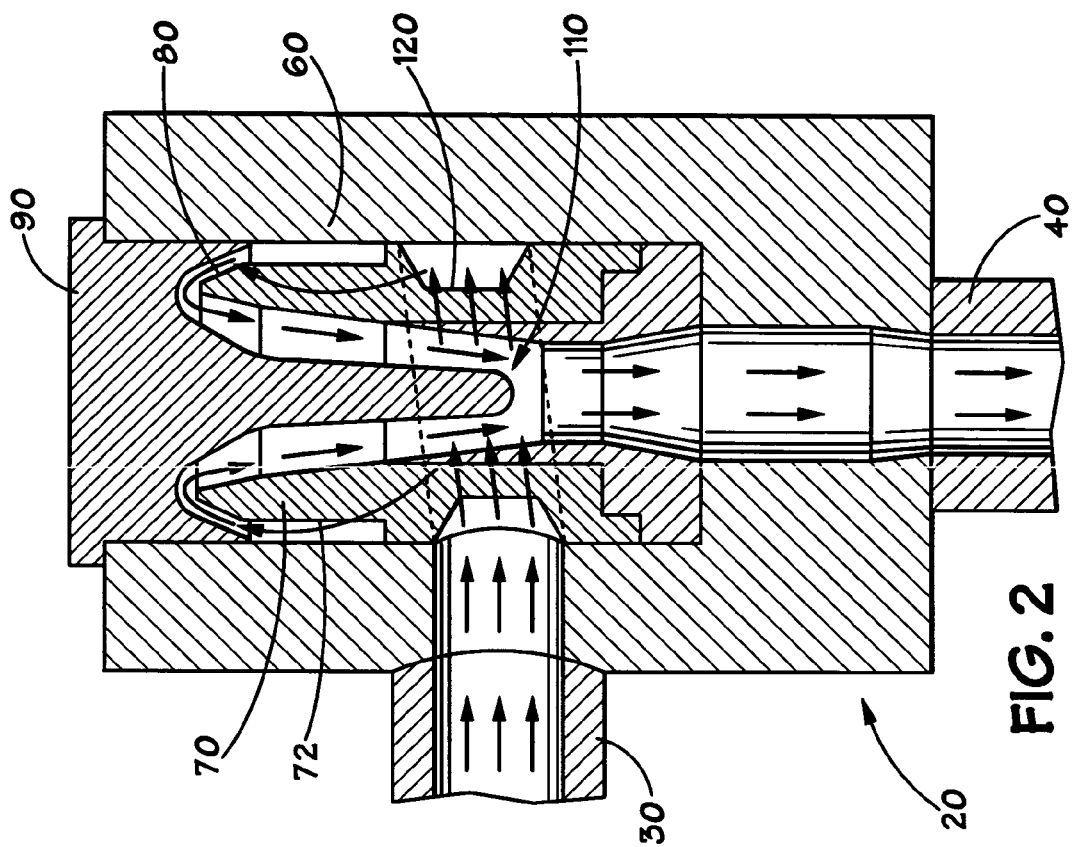
FIG. 2 is a partial cross-sectional side view of the preferred embodiment of the present invention.
Figure 3:
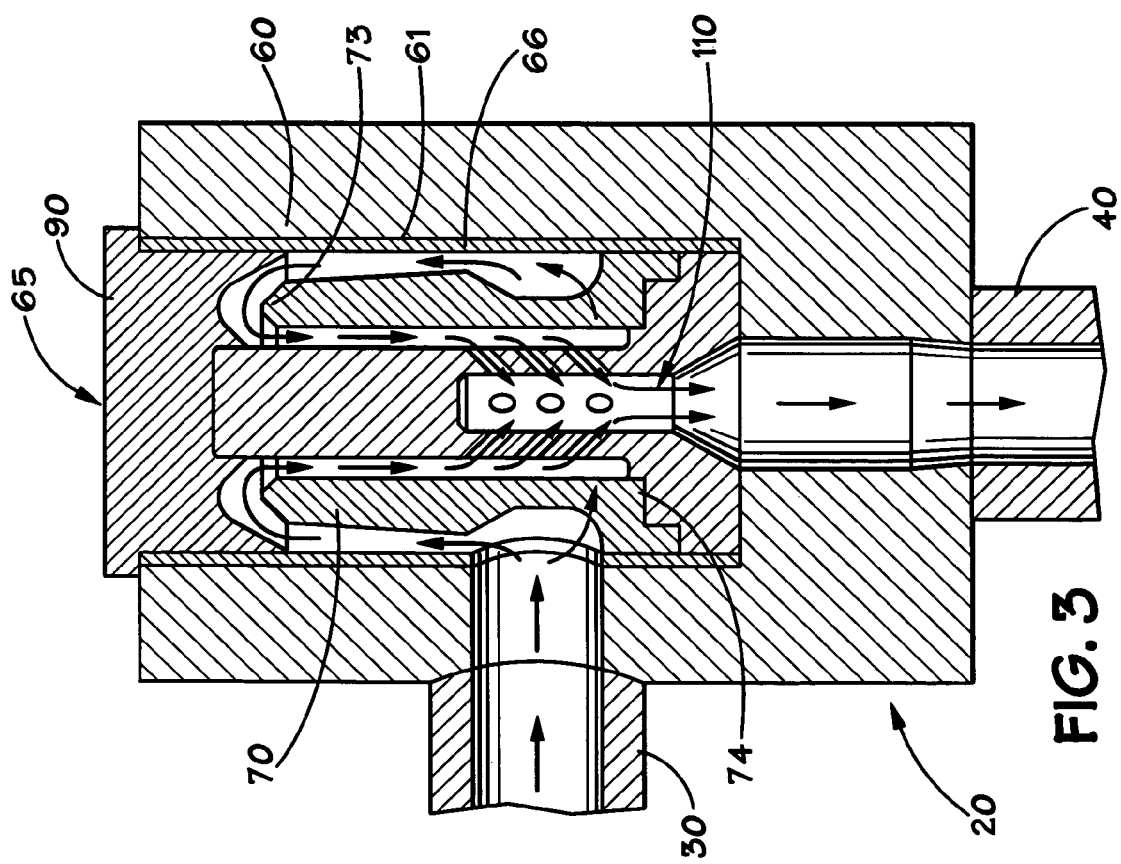
FIG. 3 is a partial cross-sectional side view of another embodiment of the present invention.

The first fluid pressure drop occurs when fluid encounters flow enhancement sleeve 70. The geometry of sleeve 70 forces fluid flow to change direction and generally flow circumferentially around outer wall surface 72 of sleeve 70 and move toward focus rim 80 at first end 73. In the preferred embodiment, as illustrated in FIG. 2, the flow is directed along a helical groove 120 disposed within outer wall surface 72 of sleeve 70. In another embodiment (not shown), helical groove 120 may be disposed upon outer wall surface 72 of sleeve 70. In still another embodiment (not shown), helical groove 120 may be disposed within inner wall surface 61 of housing 60. In still another embodiment (not shown), helical groove 120 maybe disposed upon inner wall surface 61 of housing 60. As illustrated in FIG. 3, an inner lining 66 may be disposed adjacent to inner wall surface 61 to alter the geometry within housing 60 to further regulate pressure and flow within choke valve assembly 20 or to protect surface 61.

Referring back to FIG. 1, the second fluid pressure drop occurs when fluid reaches, and then passes across, focus rim 80. At this location within enhancer 65, the fluid is subject to an approximately 180-degree directional change as it travels along outer wall surface 72 of sleeve 70, deflects off of wall surface 91 of flow focus element 90, passes across focus rim 80, and continues within the interior of sleeve 80 along inner wall surface 71 towards flow regulator 110. Focus rim 80 at first end 73 of sleeve 70 is generally outwardly rounded, and preferably has a smooth rim surface. Disposed within wall surface 91 of flow focus element 90 is an annularly shaped recess 92 to aid in deflecting flow across focus rim 80. Recess 92 is generally inwardly rounded, and preferably has a smooth wall surface without sharp angular contours. However, the shape of recess 92, and of wall surface 91 in general, can be varied in order to regulate the pressure drop occurring at this location. Likewise, the shape of focus rim 80, and the distance between focus rim 80 and flow focus element 90, can also be varied depending on flow conditions to regulate pressure drop at this location and promote a smooth flow transition towards flow regulator 110.

Figure 4:
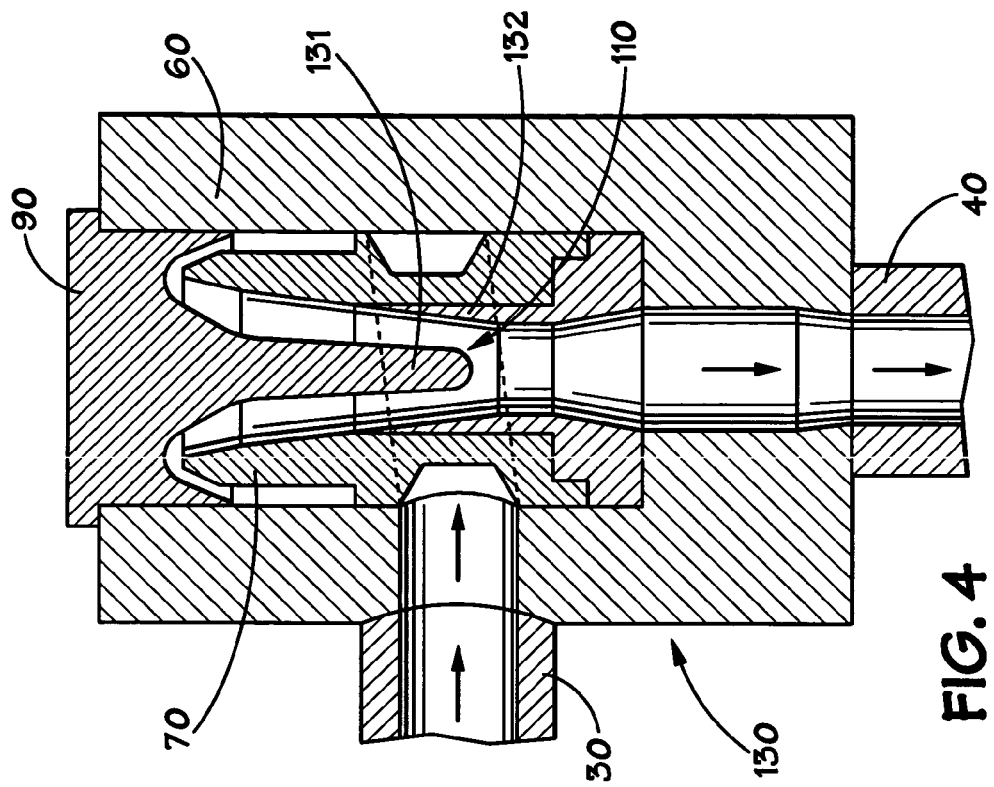
FIG. 4 is a partial cross-sectional side view of another embodiment of the present invention.

The third fluid pressure drop occurs at flow regulator 110. The flow regulator will typically utilize a conventional valve design or some improvement thereupon. FIG. 1 illustrates flow regulator 110 utilizing a simplified cage-type valve 140, wherein pressure drop occurs as the fluid passes through multiple annular passages 141 in valve 140. Alternatively, FIG. 4 illustrates flow regulator 110 utilizing a simplified needle-type valve 130, wherein pressure drop occurs as fluid passes between needle stem 131 and valve seat 132. In each of the above-described embodiments, pressure drop occurs as a result of fluid flow through a decreased flow area. Other alternative embodiments of flow regulators may be used without deviating from the spirit of the present invention.

Referring to FIG. 2, a profile of the general fluid path through choke valve assembly 20 for a preferred embodiment of the invention is shown. Fluid enters choke valve assembly 20 at flow inlet 30, encounters flow enhancement sleeve 70, is directed with a degree of angular control within helical groove 120, flows circumferentially around sleeve 70, moves towards focus rim 80, deflects off of flow focus element 90, passes across focus rim 80, continues towards flow regulator 110, passes through flow regulator 110, and exits choke valve assembly 20 at fluid outlet 40.

In a preferred embodiment of the present invention, the fluid flow within fluid flow enhancer 65 undergoes three distinct pressure drops before exiting enhancer 65 via flow outlet 40. However, it is also possible that any number of multiple pressure drops can occur within enhancer 65 without such variation deviating from the spirit of the invention, which generally pertains to causing multiple pressure drops within a choke valve assembly by effectuating changes in flow direction within the device.

It is to be understood that the invention is not limited to the exact details of construction, operation, exact materials or embodiments shown and described, as obvious modifications and equivalents will be apparent to one skilled in the art. Accordingly, the invention is therefore to be limited only by the scope of the appended claims.

We claim:

1. A fluid flow enhancer for a choke valve having a choke valve fluid flow inlet and a choke valve fluid flow outlet, the fluid flow enhancer comprising:

a flow enhancement sleeve having an inner wall surface, an outer wall surface, and first and second ends, and positioned to change fluid flow direction at a first location adjacent the choke valve fluid flow inlet where high-pressure fluid received through the choke valve fluid flow inlet encounters the flow enhancement sleeve, and to effectuate a first pressure drop at the first location to dissipate energy of the fluid flow entering the choke valve, the outer wall surface having a circumferentially extending annular recess disposed therein and positioned adjacent the first location to direct fluid flow circumferentially around the outer wall surface;

a focus rim disposed at the second end of the flow enhancement sleeve;

a flow focus element disposed in an axially spaced relationship from the focus rim, the flow focus element and the focus rim defining a flow passage therebetween, the combination of the flow focus element and the focus rim positioned to change direction of the fluid flow when entering the flow passage at a second location so that a general direction of the fluid flow when adjacent substantial portions of the outer wall surface of the flow enhancement sleeve is opposite that of the fluid flow when adjacent substantial portions of the inner wall surface of the flow enhancement sleeve, and positioned to effectuate a second pressure drop at the second location within the flow enhancer to further dissipate energy of the fluid flow, the flow focus element including a wall surface having an annular shaped recess disposed in the wall surface shaped and positioned to enhance deflecting flow across the focus rim to within an interior of the flow enhancement sleeve along the inner wall surface and towards the flow regulator, to promote a smooth fluid flow transition toward the flow regulator, and to regulate the second pressure drop at the second location; and a flow regulator disposed within a portion of the flow enhancement sleeve for receiving the fluid flow from the flow passage.

2. The flow enhancer of claim 1, wherein the recess of the flow focus element is inwardly rounded.

3. The flow enhancer of claim 1, wherein the choke valve has a longitudinal axis, wherein the flow regulator is positioned adjacent the first end of the flow enhancement sleeve, and wherein the flow regulator includes a flow regulator body having a longitudinal axis coaxially oriented with the longitudinal axis of the choke valve, an outer body surface, and an inner body surface, and includes a plurality of annular passages extending between the outer body surface and the inner body surface of the flow regulator body, positioned in an angular orientation therebetween and at an acute angular orientation to the longitudinal axis of the flow regulator body, and positioned to effectuate a third pressure drop at a third location that is separate and spaced apart from the first and second locations to thereby further dissipate energy of the fluid flow.

4. The flow enhancer of claim 1, wherein the flow enhancement sleeve has a first diameter at a position downstream of and adjacent to the choke valve inlet and a second diameter at a position upstream of and adjacent to the focus rim, and wherein the first diameter is larger than the second diameter.

5. The flow enhancer of claim 1, wherein the choke valve inlet has a longitudinal axis, wherein the flow enhancement sleeve has a first diameter at a position downstream of and adjacent to the choke valve inlet and a second diameter at a position disposed in an axially spaced relationship from the choke valve inlet, and wherein the first diameter is substantially larger than the second diameter.

6. The flow enhancer of claim 1, wherein the fluid flow enhancer effectuates a significant fluid pressure drop between the choke valve fluid flow inlet and the choke valve fluid flow outlet.

7. A choke valve, comprising:
a fluid flow inlet;
a fluid flow outlet; and
a choke valve body for facilitating flow between the fluid flow inlet and the fluid flow Outlet, the choke valve body including:
  a housing having an inner wall surface, an outer wall surface, and an inner wall Surface,
  a flow enhancement sleeve having an inner wall surface, an outer wall surface, and first and second ends, disposed within a portion of the housing. and positioned to change fluid flow direction at a location adjacent the choke valve fluid flow inlet where high-pressure fluid received through the choke valve fluid flow inlet encounters the flow enhancement sleeve to define a first location, and to effectuate a first pressure drop at the first location to dissipate energy of the fluid flow, the outer wall surface of the flow enhancement sleeve having a circumferentially extending annular recess disposed therein and positioned adjacent the first location to direct fluid flow circumferentially around the outer wall surface,
  a focus rim disposed at the first end of the flow enhancement sleeve,
  a flow focus element disposed in an. axially spaced relationship from the focus rim, the flow focus element and the focus rim defining a flow passage therebetween, the combination of the flow focus element and the focus rim positioned to change direction of the fluid flow when entering the flow passage at a second location so that a general direction of the fluid flow when adjacent substantial portions of the outer wall surface of the flow enhancement sleeve is opposite that of the fluid flow when adjacent substantial portions of the inner wall surface of the flow enhancement sleeve, and positioned to effectuate a second pressure drop at the second location within the choke body to further dissipate energy of the fluid flow, the flow focus element including a wall surface having an annular shaped recess disposed in the wall surface shaped and positioned to enhance deflecting the fluid flow across the focus rim to within an interior of the flow enhancement sleeve along the inner wall surface of the flow enhancement sleeve and towards the flow regulator, to promote a smooth fluid flow transition toward the flow regulator, and to regulate the second pressure drop at the second location and
  a flow regulator disposed within a portion of the flow enhancement sleeve for receiving the fluid flow from the flow passage.

8. The choke valve of claim 7, wherein the recess of the flow focus element is inwardly rounded.

9. The choke valve of claim 7, wherein the choke valve body has a longitudinal axis, wherein the flow regulator is a cage-type valve positioned adjacent the second end of the flow enhancement sleeve, and wherein the flow regulator includes a flow regulator body having a longitudinal axis coaxially oriented with the longitudinal axis of the choke valve, an outer body surface, and an inner body surface, and includes a plurality of annular passages extending between the outer body surface and the inner body surface of the flow regulator body, positioned in an angular orientation therebetween and at an acute angular orientation to the longitudinal axis of the flow regulator body, and positioned to effectuate a third pressure drop at a third location that is separate and spaced apart from the first and second locations to thereby further dissipate energy of the fluid flow.

10. The choke valve of claim 7, wherein the flow enhancement sleeve has a first diameter at a position downstream of and adjacent to the choke valve inlet and a second diameter at a position upstream of and adjacent to the focus rim, and wherein the first diameter is larger than the second diameter.

11. The choke valve of claim 7, wherein the choke valve inlet has a longitudinal axis, wherein the flow enhancement sleeve has a first diameter at a position downstream of and adjacent to the choke valve inlet and a second diameter at a position disposed in an axially spaced relationship from the choke valve inlet, and wherein the first diameter is substantially larger than the second diameter.

12. The choke valve of claim 7, wherein the choke valve body effectuates a significant fluid pressure drop between the choke valve fluid flow inlet and the choke valve fluid flow outlet.

* * * * *